Jan. 24, 1967  J. VAN DEN BERG  3,299,936
REPAIR PLASTER FOR A MOTOR-CAR TIRE
Original Filed July 29, 1963

Jan Van Den Berg
INVENTOR.

BY Wendroth, Lind
and Ponack, attys.

United States Patent Office 3,299,936
Patented Jan. 24, 1967

3,299,936
REPAIR PLASTER FOR A MOTOR-CAR TIRE
Jan van den Berg, Bussum, Netherlands, assignor to Tyresoles Nederland N.V., Bussum, Netherlands
Continuation of application Ser. No. 298,036, July 29, 1963. This application Mar. 17, 1966, Ser. No. 536,942
Claims priority, application Netherlands, July 31, 1962, 281,587
2 Claims. (Cl. 152—367)

This application is a continuation of application Serial No. 298,036 filed July 29, 1963, now abandoned.

It is conventional to make use of a repair plaster for repairing a torn or pierced motor-car tire. Such a plaster, which consists of a sheet of rubber having reinforcement cords made of metal or textile material embedded therein in accordance with the reinforcement of the pneumatic tire to be repaired, is applied to the inner side of the tire to be repaired to cover the damaged spot of the tire with a good oversize.

Experience has taught that repairing a damaged motor-car tire with a repair plaster of this type is hardly satisfactory, even in case use is made of a repair plaster extending through the tire to be repaired from bead to bead.

The invention is based upon the insight that this drawback is caused by the reinforcement cords embedded in the rubber or similar material of the repair plaster being unsatisfactorily anchored.

It is an object of the present invention to obviate this drawback by an improved structure of a repair plaster of the subject type.

To achieve this the repair plaster according to the invention has one or a few uninterrupted reinforcement cord(s) which is or are embedded in the plaster material in zig-zag fashion between the ends of the plaster. In addition, according to the invention, the turning points of the reinforcement cord(s) may be disposed in off-set relationship along the transverse edges of the plaster.

On account of the or each reinforcement cord being each time curved back adjacent an end of the repair plaster in parallel relationship to itself and within the plane of the plaster, the reinforcement cord is so anchored in the plaster material as to enable the repair plaster to resist successfully any external as well as internal load of the tire normally to be expected in the place where said plaster is applied to the inner side of a motor-car tire to be repaired, so that a reliable repair of a damaged tire may indeed be spoken of.

The invention is suitable for application to a repair plaster for both a tire having a cross-wise reinforcement and a tire having a radial reinforcement, because in each repair plaster reinforced in compliance with the configuration of the reinforcement of a tire the anchoring of the reinforcement in the plaster material will meet the highest requirements to be demanded of it. Naturally, it will particularly be attractive to apply the invention to repair plasters which extend through the tire to be repaired from bead to bead.

In illustration of the invention an embodiment of the repair plaster will be described, by way of example, with reference to the accompanying drawings.

Figure 1:
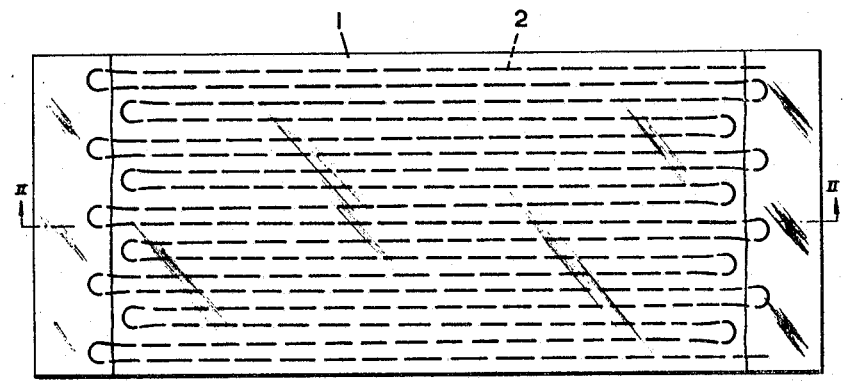
FIGURE 1 is a top view of the repair plaster.
Figure 2:
FIGURE 2 is a section taken along the line II—II in FIGURE 1.

Referring to the drawings, the repair plaster consists of a strip 1 which is beveled at the ends and made of rubber or similar material. The strip 1 contains a reinforcement cord 2 arranged in zig-zag fashion and preferably consisting of metal wire or metal rope.

I claim:

1. A repair plaster for a motor-car tire, consisting of; a single thin layer of elastic rubberlike material and a reinforcement cord entirely embedded and anchored in said layer, said cord being uninterrupted and extending along a zig-zag path over the length of said plaster with the turning points thereof located adjacent the transverse edges of said plaster.

2. A repair plaster according to claim 1 wherein the turning points of said reinforcement cord are disposed in offset relationship along the transverse edges of the plaster.

References Cited by the Examiner
UNITED STATES PATENTS
1,310,156   7/1919   Clark _____ 152—367

FOREIGN PATENTS
1,153,397   9/1957   France.

ARTHUR L. LA POINT, *Primary Examiner.*

C. W. HAEFELE, *Assistant Examiner.*